United States Patent
Vinson et al.

(10) Patent No.: US 10,943,620 B1
(45) Date of Patent: Mar. 9, 2021

(54) DATA STORAGE DEVICE UPDATING REFRESH METRIC BASED ON QUALITY OF VICTIM DATA TRACK DURING WRITE OPERATION

(71) Applicant: Western Digital Technologies, Inc., San Jose, CA (US)

(72) Inventors: Wayne H. Vinson, Longmont, CO (US); David R. Hall, Rochester, MN (US); Stephanie L. Aho, Rochester, MN (US); Zarko Popov, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/912,912

(22) Filed: Jun. 26, 2020

(51) Int. Cl.
*G11B 27/36* (2006.01)
*G11B 21/08* (2006.01)
*G11B 5/012* (2006.01)

(52) U.S. Cl.
CPC ............ *G11B 21/083* (2013.01); *G11B 5/012* (2013.01)

(58) Field of Classification Search
CPC ..... G11B 7/1267; G11B 7/00; G11B 7/00736; G11B 7/1263; G11B 20/10009; G11B 20/10481; G11B 5/6029; G11B 5/59627; G11B 27/36; G06F 3/0619; G06F 3/0653; G06F 3/0659; G06F 3/0676

USPC ............. 360/55, 75, 77.04, 77.08, 77.02, 31
See application file for complete search history.

(56) References Cited

U.S. PATENT DOCUMENTS

| | | | |
|---|---|---|---|
| 7,567,400 B2 | 7/2009 | Cheng | |
| 7,649,704 B1 | 1/2010 | Bombet et al. | |
| 7,672,072 B1 | 3/2010 | Boyle et al. | |
| 7,974,029 B2 | 7/2011 | Tsai et al. | |
| 8,174,780 B1 | 5/2012 | Tsai et al. | |
| 8,806,117 B2 * | 8/2014 | Islam | G11B 5/09 711/106 |
| 8,879,188 B1 * | 11/2014 | Chia | G11B 5/6029 360/55 |
| 8,953,271 B1 * | 2/2015 | Chayarangkan | G11B 5/59627 360/55 |
| 9,099,155 B1 | 8/2015 | Kataria et al. | |
| 9,330,701 B1 | 5/2016 | Michel et al. | |
| 9,384,774 B1 * | 7/2016 | Nookala | G11B 5/02 |
| 9,495,988 B1 | 11/2016 | Liu et al. | |
| 10,379,760 B1 * | 8/2019 | Hall | G06F 3/0653 |

\* cited by examiner

*Primary Examiner* — Nabil Z Hindi

(57) ABSTRACT

A data storage device is disclosed comprising a head actuated over a disk comprising a plurality of data tracks, including a first data track and a second data track. In connection with writing to at least part of the first data track, a quality metric is measured for at least part of the first data track. In connection with writing to at least part of the second data track, a refresh metric is updated based on the write to at least part of second data track and the quality metric measured for the first data track, and at least the first data track is refreshed based on the refresh metric.

20 Claims, 4 Drawing Sheets

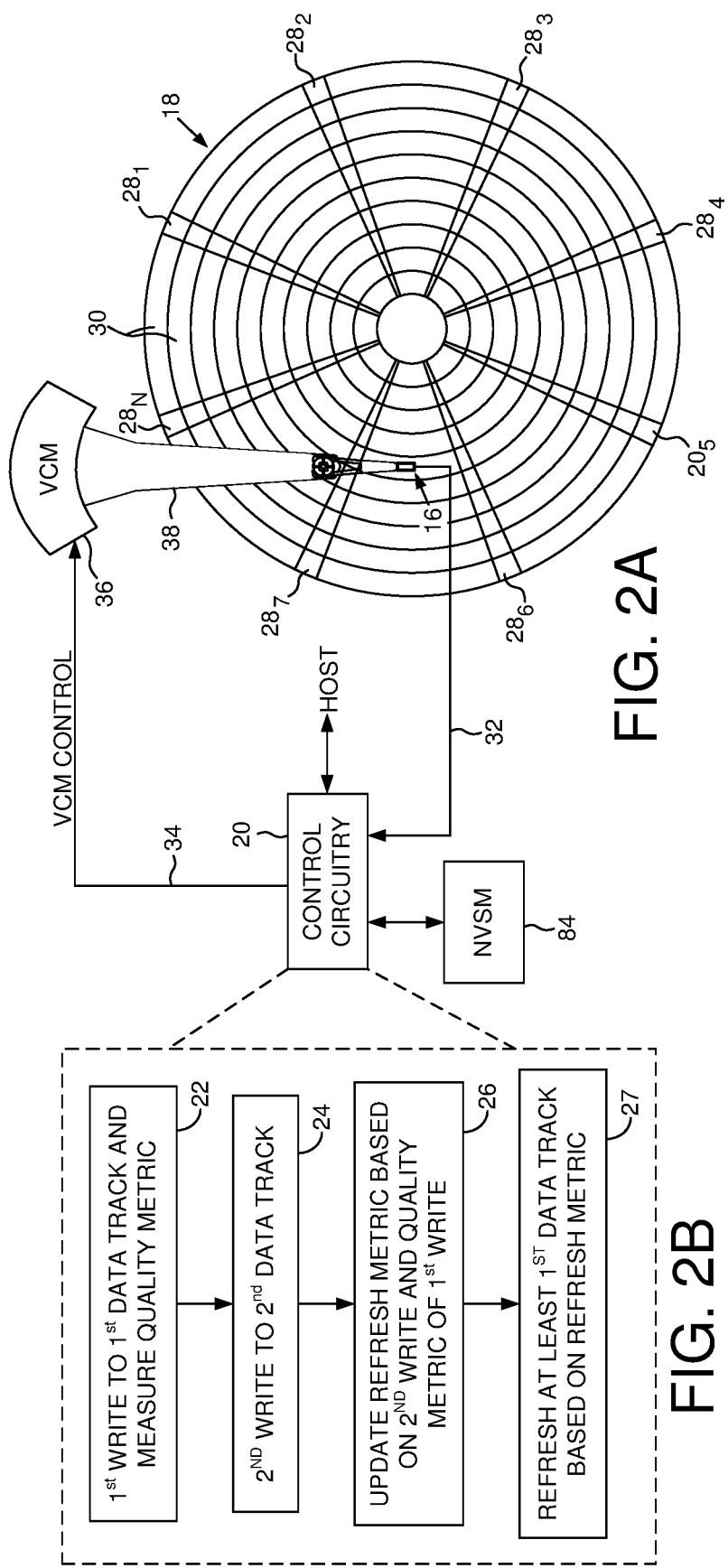
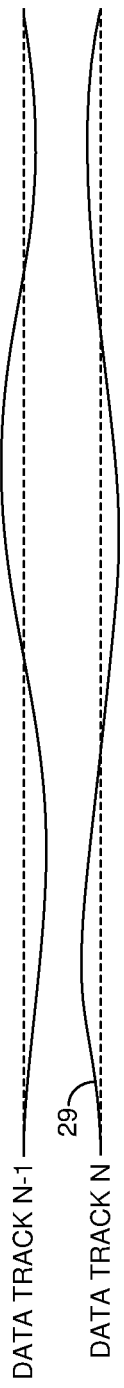
FIG. 2A
FIG. 2B
FIG. 2C

DATA STORAGE DEVICE UPDATING REFRESH METRIC BASED ON QUALITY OF VICTIM DATA TRACK DURING WRITE OPERATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to the disk by modulating a write current in an inductive coil (write coil) to record magnetic transitions onto the disk surface in a process referred to as saturation recording. During read-back, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface during write operations in order to decrease the coercivity of the magnetic medium, thereby enabling the magnetic field generated by the write coil to more readily magnetize the disk surface. Any suitable technique may be employed to heat the surface of the disk in HAMR recording, such as by fabricating a laser diode and a near field transducer (NFT) with other write components of the head. Microwave assisted magnetic recording (MAMR) is also a recent development that improves the quality of written data by using a spin torque oscillator (STO) to apply a high frequency auxiliary magnetic field to the media close to the resonant frequency of the magnetic grains, thereby enabling the magnetic field generated by the write coil to more readily magnetize the disk surface.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein when writing to a first data track, a quality metric is measured and used to update a refresh metric when writing to a second data track.

FIG. 2C shows a trajectory of the head when writing to a data track N-1 and a trajectory of the head when writing to a data track N.

DETAILED DESCRIPTION

Figure 1:
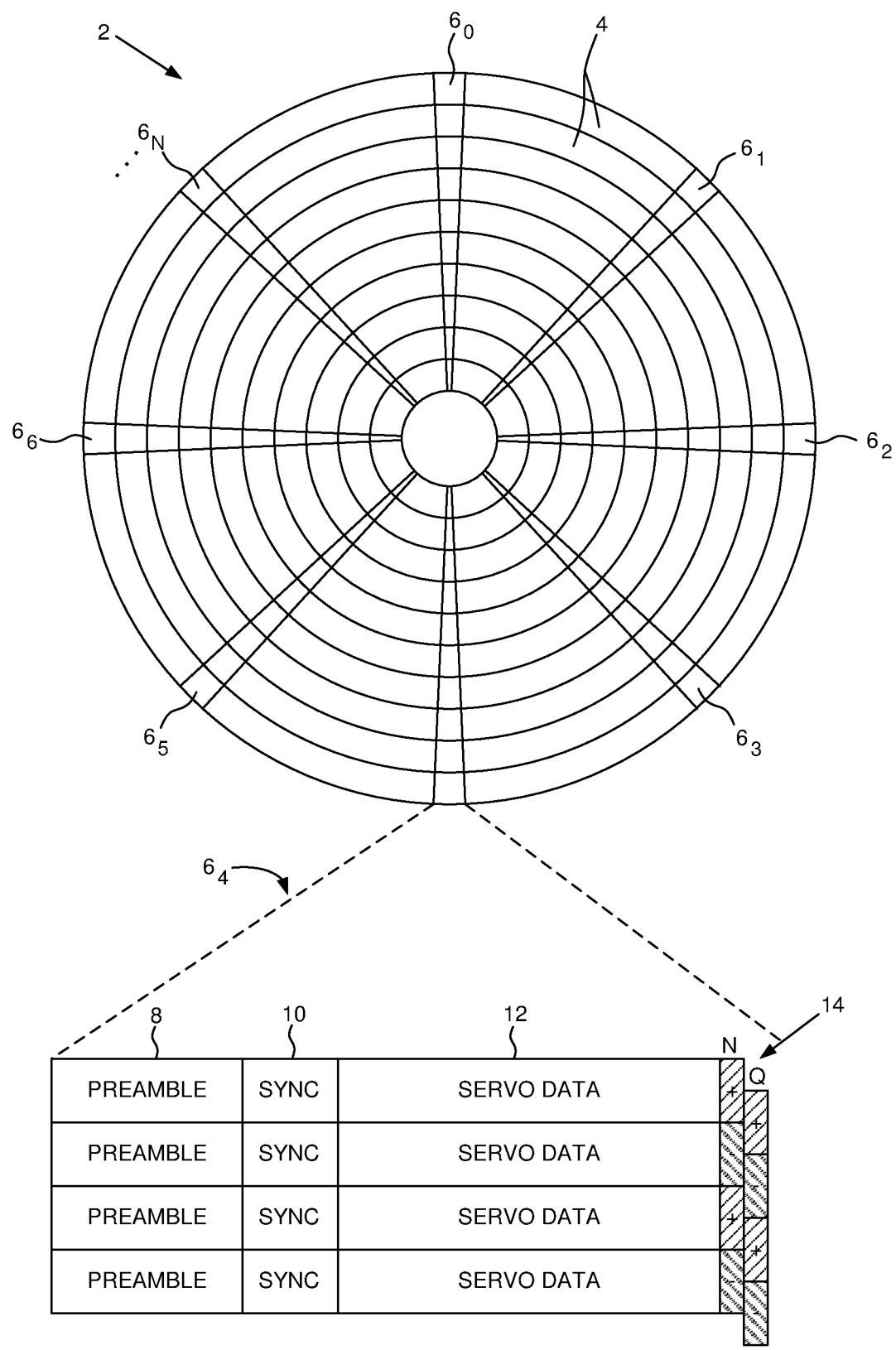
FIG. 1 shows a prior art disk format comprising a plurality of servo tracks defined by servo sectors.

FIG. 2A shows a data storage device in the form of a disk drive according to an embodiment comprising a head 16 actuated over a disk 18 comprising a plurality of data tracks, including a first data track and a second data track (FIG. 2C). The disk drive further comprises control circuitry 20 configured to execute the flow diagram of FIG. 2B, wherein in connection with a first write to at least part of the first data track, a quality metric is measured for at least part of the first data track (block 22). In connection with a second write to at least part of the second data track (block 24), a refresh metric is updated based on the second write to at least part of the second data track and the quality metric measured for the first data track (block 26). At least the first data track is refreshed based on the refresh metric (block 27).

In the embodiment of FIG. 2A, the disk 18 comprises a plurality of servo sectors 281-28N that define a plurality of servo tracks, wherein the data tracks 30 are defined relative to the servo tracks at the same or different radial density. The control circuitry 20 processes a read signal 32 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 34 applied to a VCM 36 which rotates an actuator arm 38 about a pivot in order to actuate the head radially over the disk surface in a direction that reduces the PES. In one embodiment, the head 16 may be actuated over the disk 18 based on the PES using one or more secondary actuators, for example, a microactuator that actuates a suspension coupling a head slider to the actuator arm 38, or a microactuator that actuates the head slider relative to the suspension (e.g., using a thermal actuator, piezoelectric actuator, etc.). The servo sectors 281-28N may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, the data written to the data tracks may degrade over time due to a number of factors, such as general magnetic entropy that may occur over time (which can be exacerbated by temperature), or adjacent track interference (ATI) that occurs when writing adjacent data tracks (which can be cumulative over time). For example referring to FIG. 2C, when writing to data track N along trajectory 29, the head may deviate toward data track N−1, thereby at least partially overwriting the data recorded in data track N−1. When the data recorded in a data track degrades below a threshold, the data is typically refreshed by performing a read/write operation in order to rewrite the degraded data track(s), thereby refreshing the recorded data before the data tracks become unreadable. In one embodiment, a plurality of refresh zones each comprising a band of the data tracks is defined, wherein the data tracks of a refresh zone may be refreshed together when a refresh operation is triggered for the zone.

Figure 3A:
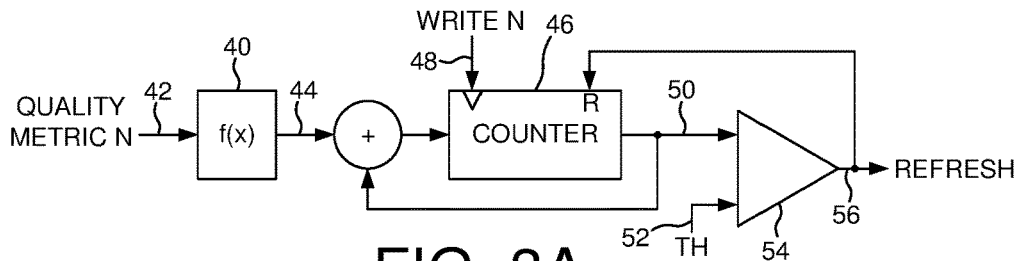
FIG. 3A shows a prior art technique for updating a refresh metric based on a quality metric measured while writing to data track N.

FIG. 3A shows a prior art technique for updating a refresh metric disclosed in U.S. Pat. No. 8,174,780 entitled "DISK DRIVE BIASING A REFRESH MONITOR WITH WRITE PARAMETER OF A WRITE OPERATION," the disclosure of which is incorporated herein by reference. The refresh monitor shown in FIG. 3A comprises an update function f(x) 40 responsive to a write operation quality metric 42 in connection with writing to data track N. The update function f(x) 40 outputs a value 44 that is accumulated by a counter 46 when enabled (clocked) by a write signal 48 at each write operation to data track N. The output 50 of the counter 46 is compared to a threshold 52 at comparator 54, wherein a refresh signal 56 is activated when the counter output 50 exceeds the threshold 52. The refresh signal 56 initiates a refresh operation of at least one data track (e.g., adjacent data track N−1), and resets the counter 46.

Figure 3B:
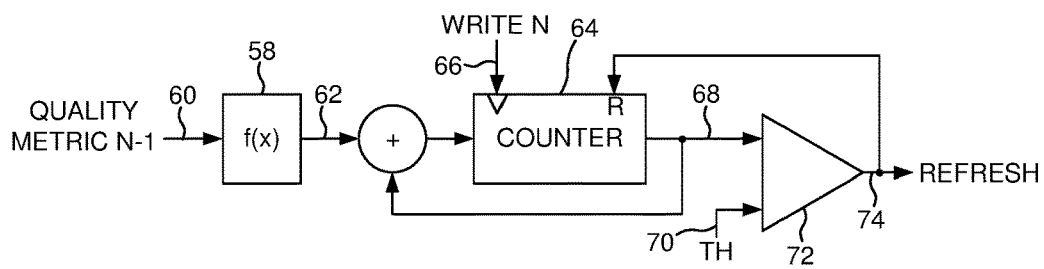
FIG. 3B shows an embodiment wherein a refresh metric is updated when writing to data track N based on a quality metric measured when writing to data track N-1.

FIG. 3B shows a refresh monitor according to an embodiment comprising an update function f(x) 58 responsive to a quality metric 60 measured when writing to a first data track (e.g., data track N−1). When writing to a second data track (e.g., data track N), the update function f(x) 58 outputs a value 62 that is accumulated by a counter 64 when enabled (clocked) by a write signal 66. The output 68 of the counter 64 is compared to a threshold 70 at comparator 72, wherein a refresh signal 74 is activated when the counter output 68 exceeds the threshold 70. The refresh signal 74 initiates a refresh operation of at least one data track (e.g., adjacent data track N−1), and resets the counter 64. Accordingly in the embodiment of FIG. 3B, when writing to data track N the refresh metric is updated based on a quality metric measured when writing to data track N−1.

Figure 4A:
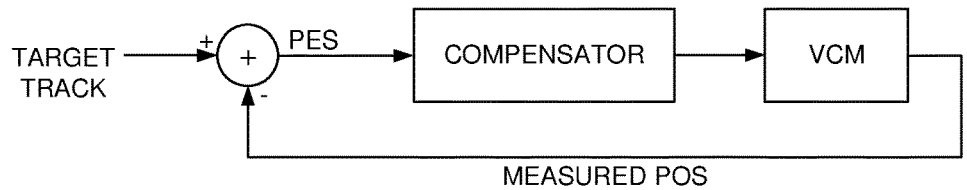
FIG. 4A shows a servo control system according to an embodiment for generating a PES used to control the position of the head during a write operation.

Any suitable quality metric may be measured when writing to an adjacent data track (e.g., data track N−1), wherein in one embodiment the quality metric comprises a PES generated by reading the servo sectors 281-28N and processed by a servo control system such as shown in FIG. 4A. In one embodiment when writing to data track N−1 (such as shown in FIG. 2C), when the PES indicates the head is deviating away from a centerline of data track N−1 toward a centerline of data track N, the quality metric may be generated by accumulating the PES while writing to data track N−1. The quality metric is then used to update the refresh metric when writing to data track N, such as by using the refresh monitor shown in FIG. 3B, so that the refresh occurs sooner. That is, when the head deviates toward data track N when writing to data track N−1 as indicated by the PES, the ATI effect on data track N−1 when writing to data track N is typically exacerbated, and therefore the refresh metric is accelerated toward the refresh trigger.

Figure 4B:
FIG. 4B shows an example PES1 when writing to data track N-1 which in one embodiment is saved as the quality metric.
Figure 4C:
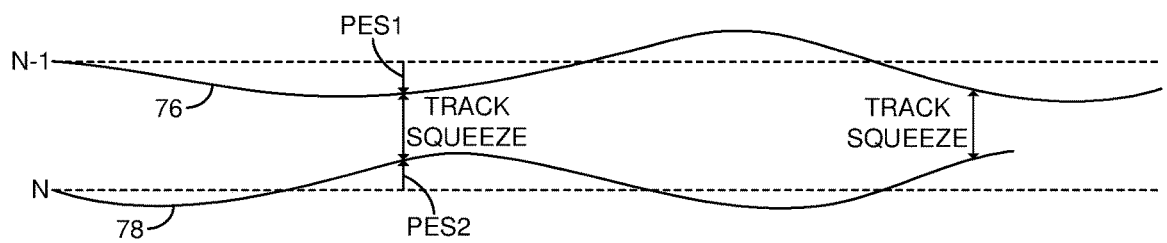
FIG. 4C shows an example PES2 when writing to data track N which in one embodiment is used in combination with PES1 to generate a track squeeze measurement for updating the refresh metric.

In another embodiment understood with reference to FIGS. 4B and 4C, the PES1 generated at each servo sector along trajectory 76 when writing to data track N−1 is saved as a quality metric. When writing to data track N as shown in FIG. 4C, a track squeeze metric is computed at each servo sector representing the distance between the PES1 along trajectory 76 when writing to data track N−1 and the PES2 along trajectory 78 when writing to data track N. As the distance decreases (track squeeze increases), the resulting ATI of data track N−1 (the victim data track) increases, thereby degrading the data written to data track N−1. In one embodiment, the track squeeze metric is computed and accumulated during the write to data track N (e.g., by function f(x) 58 in FIG. 3B) in order to update the refresh metric.

Figure 5A:
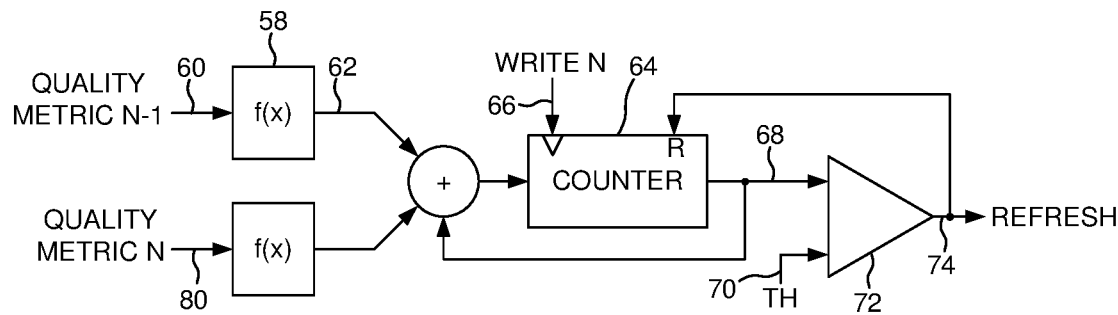
FIG. 5A shows an embodiment wherein when writing to data track N, a refresh metric is updated based on a quality metric measured when writing to data track N and based on a quality metric measured when writing to data track N-1.

FIG. 5A shows an embodiment wherein when writing to data track N a refresh metric may be updated based on a quality metric 80 measured when writing to data track N as shown in FIG. 3A, as well as based on a quality metric 60 measured when writing to data track N−1. That is, in one embodiment the refresh monitor may include one or more features disclosed in the above-incorporated U.S. Pat. No. 8,174,780, together with updating the refresh metric based on a quality metric measured when writing to an adjacent data track. In addition, the general embodiment of a refresh monitor shown in FIG. 3B may be modified in any manner as taught in the above-incorporated U.S. Pat. No. 8,174,780.

Figure 5B:
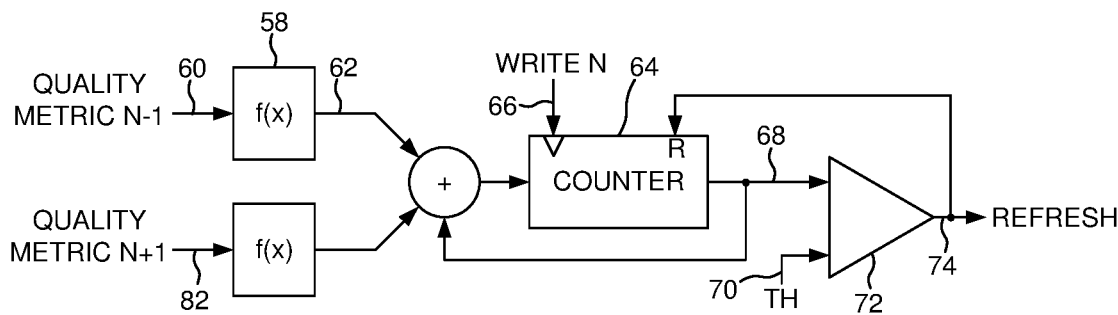
FIG. 5B shows an embodiment wherein when writing to data track N, a refresh metric is updated based on a quality metric measured when writing to data track N-1 and based on a quality metric measured when writing to data track N+1.

FIG. 5B shows an embodiment wherein when writing to data track N a refresh metric may be updated based on a quality metric 60 measured when writing to data track N−1, as well as based on a quality metric 82 when writing to data track N+1. That is when writing to data track N, the write operation may be deleterious to both the data tracks adjacent to data track N (e.g., the write operation may cause ATI of both data tracks). In this embodiment, a refresh zone comprises a plurality of data tracks, including data tracks N−1, N, and N+1, wherein all of the data tracks of the zone may be refreshed when the refresh metric reaches the refresh threshold. In another embodiment, a refresh metric may be maintained for each data track (e.g., using the refresh monitor of FIG. 3B), wherein each data track may be refreshed when the corresponding refresh metric reaches the refresh threshold.

Figure 5C:
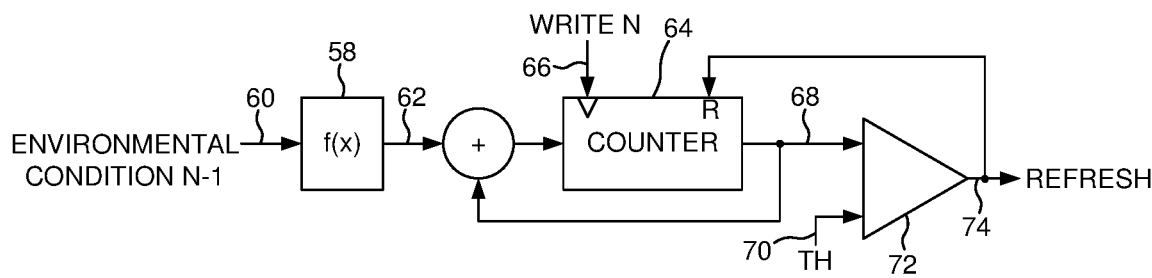
FIG. 5C shows an embodiment wherein when writing to data track N, a refresh metric is updated based on an environmental condition (e.g., temperature) measured when writing to data track N-1.

FIG. 5C shows an embodiment wherein the quality metric 60 measured when writing to data track N−1 comprises any suitable environmental condition, such as the ambient temperature during the write operation. For example, in one embodiment the fidelity of the data written to data track N−1 may decrease as the ambient temperature increases, and therefore the deleterious effect on data track N−1 when writing to data track N (e.g., ATI) may be exacerbated. Accordingly, in one embodiment the refresh metric is updated when writing to data track N as shown in FIG. 5C in a manner that accounts for the environmental effect when writing to an adjacent data track.

Figure 5D:
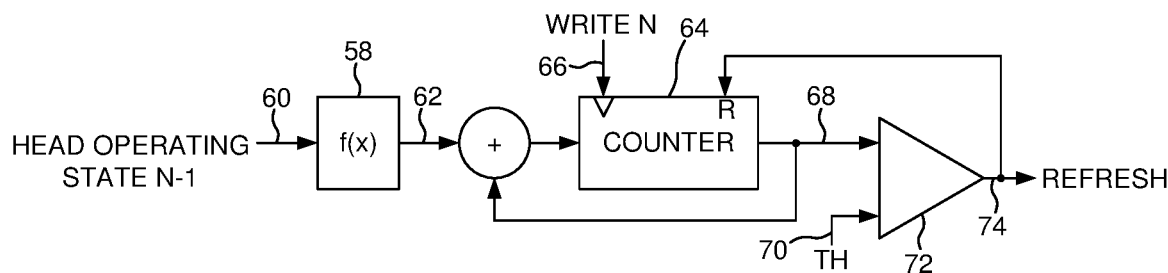
FIG. 5D shows an embodiment wherein when writing to data track N, a refresh metric is updated based on an operating state of the head (e.g., fly height) measured when writing to data track N-1.

FIG. 5D shows an embodiment wherein the quality metric 60 measured when writing to data track N−1 comprises any suitable operating state of the head, such as the fly height of the head or the output power of a write assist element (e.g., HAMR or MAMR). For example, in one embodiment the fidelity of the data written to data track N−1 may decrease as the fly height of the head increases, or as the output power of a write assist element decreases, and therefore the deleterious effect on data track N−1 when writing to data track N (e.g., ATI) may be exacerbated. Accordingly, in one embodiment the refresh metric is updated when writing to data track N as shown in FIG. 5D in a manner that accounts for the operating state of the head when writing to an adjacent data track.

In some embodiments, the refresh metric may be updated when writing to data track N based on multiple different types of quality metrics measured when writing to data track N−1. For example, in one embodiment the refresh metric may be updated based on the PES or track squeeze, an environmental condition, and an operating state of the head when writing to data track N−1. In one embodiment, each of the different quality metrics may be adjusted by a corresponding function f(x) 58 such as shown in FIG. 3B, which may include a weighting each of the quality metric. For example, the quality metric based on PES or track squeeze may cause more significant degradation of the data written to data track N−1, and therefore this quality metric may be assigned a higher significance (higher weight) when updating the refresh metric when writing to data track N.

In one embodiment, the quality metric 60 measured when writing to each data track may be saved in a non-volatile memory, such as on the disk 18 in FIG. 2A, or in a non-volatile semiconductor memory (NVSM) 84, such as a Flash memory. As described above, the quality metric 60 measured when writing to a data track may be a single value representing, for example, an accumulated PES, environmental condition, operating state of the head, etc., whereas in other embodiments the quality metric may comprise multiple values measured when writing to data track N−1, such as the PES generated at each servo sector as in the embodiment of FIGS. 4B and 4C. In addition, the refresh metrics, which may track the refresh of a partial data track, a single data track, or a zone of data tracks, may also be stored in the non-volatile memory and then loaded into a refresh monitor such as shown in FIG. 3B for updating during subsequent write operations.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data tracks, including a first data track and a second data track;
   a head actuated over the disk; and
   control circuitry configured to:
      first write to at least part of the first data track and measure a quality metric for at least part of the first data track;
      second write to at least part of the second data track;
      update a refresh metric based on the second write to at least part of second data track and the quality metric measured for the first data track; and
      refresh at least the first data track based on the refresh metric.

2. The data storage device as recited in claim 1, wherein the quality metric measured for the first data track comprises a first position error signal (PES) generated during the first write.

3. The data storage device as recited in claim 2, wherein when the first PES indicates the head is deviating away from a centerline of the first data track toward a centerline of the second data track, the control circuitry is further configured to update the refresh metric to cause the refresh to occur sooner.

4. The data storage device as recited in claim 3, wherein the control circuitry is further configured to:
   measure a second PES during the second write to the second data track; and
   update the refresh metric based on the quality metric measured for the first data track and the second PES.

5. The data storage device as recited in claim 4, wherein when the first PES indicates the head is deviating away from a centerline of the first data track toward a centerline of the second data track and the second PES indicates the head is deviating away from a centerline of the second data track toward a centerline of the first data track, the control circuitry is further configured to update the refresh metric to cause the refresh to occur sooner.

6. The data storage device as recited in claim 2, wherein the control circuitry is further configured to:
   measure a second PES during the second write to the second data track; and
   update the refresh metric based on the quality metric measured for the first data track and the second PES.

7. The data storage device as recited in claim 6, wherein when the first PES indicates the head is deviating away from a centerline of the first data track toward a centerline of the second data track and the second PES indicates the head is deviating away from a centerline of the second data track toward a centerline of the first data track, the control circuitry is further configured to update the refresh metric to cause the refresh to occur sooner.

8. The data storage device as recited in claim 1, wherein the quality metric measured for the first data track comprises an environmental condition during the first write.

9. The data storage device as recited in claim 1, wherein the quality metric measured for the first data track comprises an operating state of the head during the first write.

10. A data storage device comprising:
    a disk comprising a plurality of data tracks, including a first data track and a second data track;
    a head actuated over the disk; and
    control circuitry configured to:
       while first writing to at least part of the first data track, measure a first position error signal (PES) for at least part of the first data track indicating a position of the head relative to the first data track;
       second write to at least part of the second data track;
       update a refresh metric based on the second write to at least part of the second data track and the first PES; and
       refresh at least the first data track based on the refresh metric.

11. The data storage device as recited in claim 10, wherein when the first PES indicates the head is deviating away from a centerline of the first data track toward a centerline of the second data track, the control circuitry is further configured to update the refresh metric to cause the refresh to occur sooner.

12. The data storage device as recited in claim 11, wherein the control circuitry is further configured to:
    measure a second PES during the second write to the second data track; and
    update the refresh metric based on the first PES and the second PES.

13. The data storage device as recited in claim 12, wherein when the first PES indicates the head is deviating away from a centerline of the first data track toward a centerline of the second data track and the second PES indicates the head is deviating away from a centerline of the second data track toward a centerline of the first data track, the control circuitry is further configured to update the refresh metric to cause the refresh to occur sooner.

14. The data storage device as recited in claim 10, wherein the control circuitry is further configured to:
    measure a second PES during the second write to second data track; and
    update the refresh metric based on the first PES and the second PES.

15. The data storage device as recited in claim 14, wherein when the first PES indicates the head is deviating away from a centerline of the first data track toward a centerline of the second data track and the second PES indicates the head is deviating away from a centerline of second data track toward a centerline of the first data track, the control circuitry is further configured to update the refresh metric to cause the refresh to occur sooner.

16. The data storage device as recited in claim 10, wherein the control circuitry is further configured to:
    measure an environmental condition during the first write to the first data track; and
    update the refresh metric based on the second write to at least part of the second data track, the first PES, and the measured environmental condition for the first data track.

17. The data storage device as recited in claim 10, wherein the control circuitry is further configured to:
    measure an operating state of the head during the first write to the first data track; and
    update the refresh metric based on the second write to at least part of the second data track, the first PES, and the measured operating state of the head.

18. A data storage device comprising:
    a disk comprising a plurality of data tracks, including a first data track and a second data track;
    a head actuated over the disk;
    a means for first writing to at least part of the first data track and measure a quality metric for at least part of the first data track;
    a means for second writing to at least part of the second data track;

a means for updating a refresh metric based on the second write to at least part of second data track and the quality metric measured for the first data track; and a means for refreshing at least the first data track based on the refresh metric.

19. The data storage device as recited in claim 18, wherein the means for refreshing at least the first data track comprises a means for updating a refresh metric based on an environmental condition when writing to the first data track.

20. The data storage device as recited in claim 18, wherein the means for refreshing at least the first data track comprises a means for updating a refresh metric based on an operating state of the head when writing to the first data track.

* * * * *